(12) United States Patent
Fields et al.

(10) Patent No.: US 10,313,148 B1
(45) Date of Patent: Jun. 4, 2019

(54) CONFIGURING A DEVICE FOR MOVEMENT-BASED CONTROL

(71) Applicant: STATE FARM MUTUAL AUTOMOBILE INSURANCE COMPANY, Bloomington, IL (US)

(72) Inventors: Brian Mark Fields, Normal, IL (US); Lee Marvin John Assam, El Paso, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/637,650

(22) Filed: Jun. 29, 2017

(51) Int. Cl.
*G06Q 40/08* (2012.01)
*H04L 12/28* (2006.01)
*G06Q 30/02* (2012.01)
*H04L 12/12* (2006.01)

(52) U.S. Cl.
CPC ....... *H04L 12/282* (2013.01); *G06Q 30/0212* (2013.01); *G06Q 40/08* (2013.01); *H04L 12/2818* (2013.01); *H04L 12/12* (2013.01)

(58) Field of Classification Search
None
See application file for complete search history.

(56) References Cited

U.S. PATENT DOCUMENTS

| | | | | |
|---|---|---|---|---|
| 4,988,981 A | * | 1/1991 | Zimmerman | A61B 5/1114 345/156 |
| 6,431,711 B1 | * | 8/2002 | Pinhanez | G03B 21/28 348/E5.137 |
| 7,134,080 B2 | * | 11/2006 | Kjeldsen | G03B 21/28 715/730 |
| 9,329,716 B2 | * | 5/2016 | Parham | G06F 3/0304 |
| 9,607,315 B1 | * | 3/2017 | Worley, III | G06Q 30/0251 |
| 9,639,887 B2 | * | 5/2017 | McCoy | G06Q 30/0641 |

(Continued)

OTHER PUBLICATIONS

"Hyundai Gesture Control Demonstration—CES 2015", YouTube, Retrieved from the Internet on Nov. 22, 2017, <https://www.youtube.com/watch?v=EPQYDWjawdE>, 1 page.

(Continued)

*Primary Examiner* — K. Wong
(74) *Attorney, Agent, or Firm* — Marshall, Gerstein & Borun LLP; Randall G. Rueth

(57) ABSTRACT

A system for movement-based device control is presented. The system may include a control device configured to generate a control signal corresponding to at least one movement associated with the control device. The system may also include a target subsystem located remotely from the control device. The target subsystem may be configured to change from operating in a manually-controlled mode to operating in a remotely-controlled mode in response to receiving a mode change signal from the control device. The target subsystem may also be configured to receive the control signal from the control device when operating in the remotely-controlled mode. The target subsystem may additionally be configured to determine, based on the control signal, at least one control command. The target subsystem may further be configured to cause the control command(s) to be executed so that the target subsystem is controlled according to the control command(s).

16 Claims, 6 Drawing Sheets

(56) References Cited

U.S. PATENT DOCUMENTS

| | | | | |
|---|---|---|---|---|
| 9,679,215 B2* | 6/2017 | Holz | ................ | G06K 9/2036 |
| 9,727,174 B2* | 8/2017 | Starner | ................ | G06F 3/0426 |
| 9,804,686 B2* | 10/2017 | Park | ................ | G06F 3/04886 |
| 9,880,619 B2* | 1/2018 | Parham | ................ | G06F 3/014 |
| 2010/0199232 A1* | 8/2010 | Mistry | ................ | G06F 1/163 |
| | | | | 715/863 |
| 2014/0143784 A1* | 5/2014 | Mistry | ................ | G06F 15/0208 |
| | | | | 718/102 |

OTHER PUBLICATIONS

"Kinect", Wikipedia, The Free Encyclopedia, Retrieved from the Internet on Nov. 22, 2017, <https://en.wikipedia.org/wiki/Kinect>, 18 pages.

"Leap Motion", Leap Motion, Inc., Retrieved from the Internet on Nov. 22, 2017, <https://www.leapmotion.com/#103>, 5 pages.

"Wii", Wikipedia, The Free Encyclopedia, Retrieved from the Internet on Nov. 22, 2017, <https://en.wikipedia.org/wiki/Wii>, 14 pages.

* cited by examiner

CONFIGURING A DEVICE FOR MOVEMENT-BASED CONTROL

CROSS-REFERENCES TO RELATED APPLICATIONS

This application is related to (1) U.S. application Ser. No. 15/637,468, entitled "Movement-Based Device Control," filed Jun. 29, 2017, and (2) U.S. application Ser. No. 15/637,701, entitled "Utilizing Movement-Based Control Data," filed Jun. 29, 2017. The entire disclosures of each of U.S. application Ser. Nos. 15/637,468 and 15/637,701 are hereby incorporated by reference herein.

FIELD OF THE DISCLOSURE

The present disclosure generally relates to device control and, more particularly, to configuring a device to be controlled based on movement of a user.

BACKGROUND

Conventional techniques for controlling operation of a device involve a user of the device touching a switch, knob, button, dimmer, or other component of the device in order to control operation in the desired manner. For example, the user may turn on a stove burner by using his or her hand to manipulate a corresponding knob for the burner; the user may pull on a window shade cord in order to raise or lower a corresponding window shade; the user may press a button such as a temperature button on an oven to cause a temperature of the oven to increase or decrease; the user may touch a switch that controls a light bulb in a light fixture in order to move the switch to an "ON" position to cause the light bulb to illuminate. Insurance coverage provided with respect to a residence may account for the presence and/or use of various items within the residence.

Outside of a residential context, such as in the context of driving, a driver of a vehicle may receive indications of events such as an approaching emergency vehicle, or use of a crosswalk by pedestrians. The driver may change a manner of driving of the vehicle, such as by slowing down, in response to such indications. Conventional manners in which the driver receives such indications include the driver hearing an approaching emergency vehicle or noticing a flashing infrastructure component, such as a flashing light at an intersection, that indicates the emergency vehicle; or a visual indication of crossing pedestrians being provided to the driver, such as by a crossing guard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system for movement-based device control may be provided. The system may include a control device configured to generate a control signal corresponding to at least one movement associated with the control device. The system may also include a target subsystem located remotely from the control device. The target subsystem may be configured to change from operating in a manually-controlled mode to operating in a remotely-controlled mode in response to receiving a mode change signal from the control device. The target subsystem may also be configured to receive the control signal corresponding to the at least one movement associated with the control device from the control device when the target subsystem is operating in the remotely-controlled mode. The target subsystem may additionally be configured to determine, based on the control signal corresponding to the at least one movement associated with the control device, at least one control command associated with the target subsystem. The target subsystem may further be configured to cause the at least one control command associated with the target subsystem to be executed so that the target subsystem is controlled according to the at least one control command.

In another embodiment, a method for configuring a target device for movement-based control may be provided. The method may include identifying the target device. The method may also include configuring the target device to operate in response to a control signal received from a control device. The method may additionally include establishing a communicative connection between the target device and the control device. The method may further include receiving, at at least one of the target device or a component coupled to the target device, the control signal from the control device via the communicative connection in response to at least one movement associated with the control device. The control signal may cause the target device to operate according to at least one control command indicated by the control signal.

In yet another embodiment, a method for implementing movement-based control of a target device may be provided. The method may include operating the target device in a remotely-controlled mode. The target device may be configured to operate in one of the remotely-controlled mode or a manually-controlled mode. The method may also include receiving a control signal from a control device located remotely from the target device when the target device is operating in the remotely-controlled mode. The control signal may correspond to at least one movement associated with the control device. The method may additionally include determining, based on the control signal corresponding to the at least one movement associated with the control device, at least one control command associated with the target device. The method may further include causing the at least one control command associated with the target device to be executed so that the target device is controlled according to the at least one control command.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
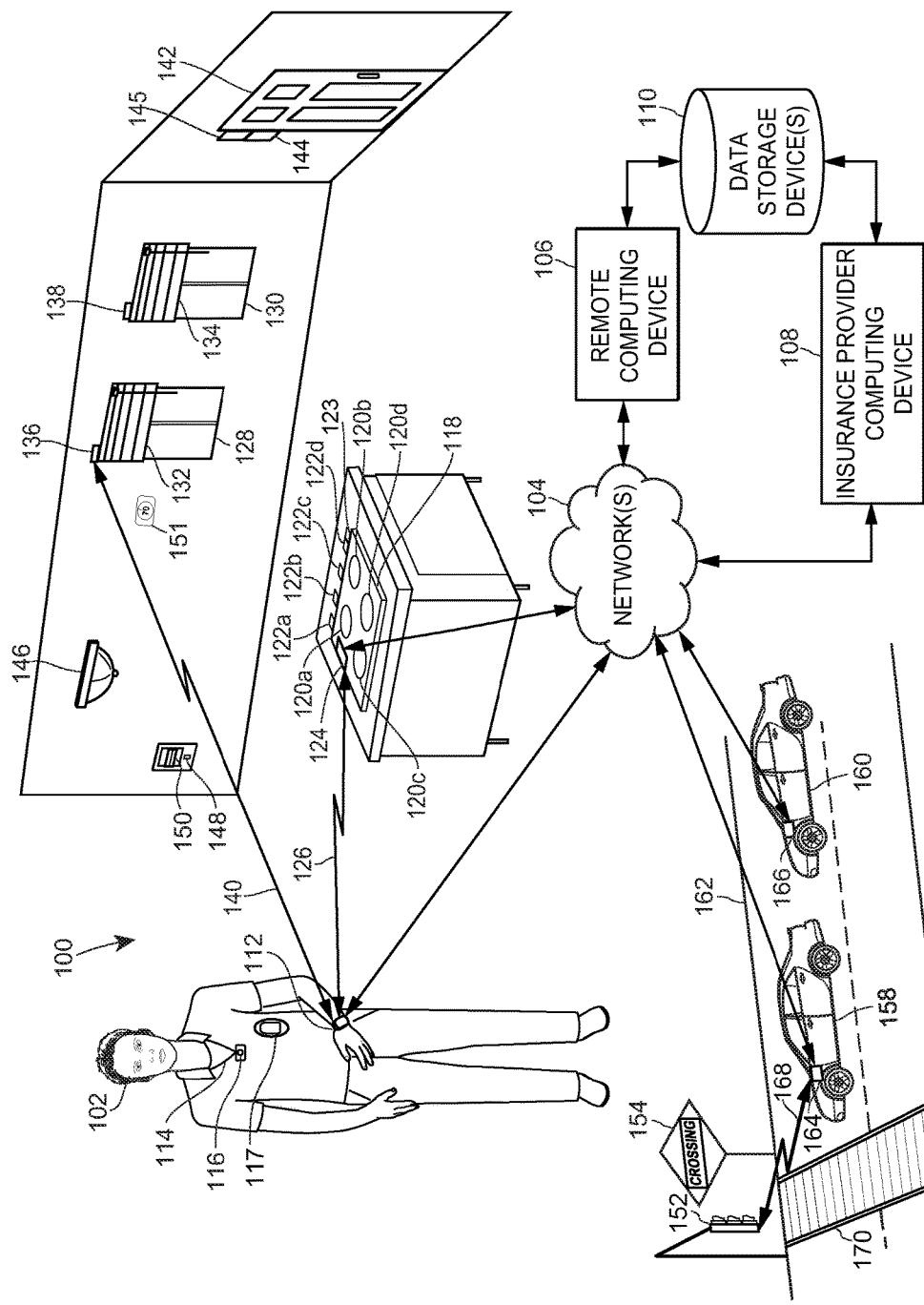
FIG. 1 illustrates a block diagram of a system for configuring a device for movement-based control and implementing movement-based device control, such as device control based on movement of a user, according to an exemplary embodiment of the present invention.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

The present embodiments relate to, among other things, techniques for configuring a device for movement-based control by a user of another (e.g., control) device. Conventionally, the operator or user of a device may control operation of the device by touching an associated switch, knob, button, dimmer, etc. and/or moving the associated switch, knob, dimmer, etc. in a particular direction and/or other manner so as to achieve the desired control of the device. For example, the user may manipulate a burner knob of a stove so as to turn on or off a corresponding burner, the user may manually open and/or lock (or unlock) a door using a door handle and/or key, the user may pull on a window shade cord to raise or lower a window shade, etc.

A user may also receive indications of events when performing activities such as driving a vehicle, and may control (e.g., drive) the vehicle based on such indications. For example, a sign, infrastructure component, siren, crossing guard, etc. may warn the driver of an oncoming emergency response system (EMS) vehicle such as an ambulance, pedestrians crossing in a crosswalk, etc. Insurance coverage provided to a user with respect to a residence, a vehicle, etc. may have terms that reward the user for the presence and/or use of various items within the residence, the vehicle, etc., such as use of door locks and/or security systems, a presence of smart home devices in general, and/or Global Positioning System (GPS) functionality within the vehicle, etc.

Conventional techniques for device control, however, typically require the presence of the user at devices to activate (e.g., move or turn) switches, knobs, buttons, etc., and/or typically require the user to use an additional device such as a remote control to control the intended device. For example, conventional techniques typically include such requirements in the case of control of an oven, a door, a stove, difficult-to-reach window shades, etc. Conventional techniques for device control also typically require, in the context of a vehicle, the driver to notice various indications in order to control the vehicle in response to such indications. Such indications may include, for example, a flashing infrastructure component or crossing guard, and various conditions such as heavy traffic or reduced visibility may make noticing such indications more difficult. Conventional techniques for device control (including vehicle control) fail to afford a user or driver functionality to perform such device control remotely and to be readily and effectively notified of a need to perform such device control (e.g., a need to slow the speed of a vehicle).

The techniques, systems, and methods disclosed herein, though, allow a user to control a device (e.g., a household device such as one of the example types described above or further described herein) from a distance, without the need for an additional device such as a conventional remote control that is used to control, for example, window shades or other devices. More particularly, in some embodiments and as further discussed below, the user may wear a control device, such as a smart watch or a necklace, and may cause at least one movement to be associated with the control device. For example, the user may perform at least one gesture, such as at least one gesture using a hand of the user. The at least one gesture may be or may correspond to the at least one movement associated with the control device, as further described below, and the at least one movement associated with the control device may be detected by the control device. The control device may generate a control signal indicative of a control command based on the at least one movement associated with the control device that has been detected by the control device. The control signal may be transmitted to a target device or to a component coupled thereto (a target device and a component coupled thereto at times being referred to herein as a "target subsystem"), such as a stove, door, window shade, etc. so as to cause the target device to operate in a desired manner.

By the user performing a gesture or gestures that result in generation of a control signal that causes the target device to operate in a desired manner, the user may control the operation of the target device using a wearable control device and an appropriate movement(s) (e.g., gesture(s)). Unlike conventional techniques requiring the presence of the user at the target device that is to be controlled, the techniques described herein allow the user to control the operation of the target device from a distance and include techniques for configuring the target device for such control. In some situations, the gesture-based device control described herein may allow a user to control a device that would otherwise be controlled by voice commands when an environment of the device is too noisy or loud to process such voice commands accurately or when the user simply prefers to utilize gesture-based device control. In some examples, as further described herein, control of a device may switch between movement-based (e.g., gesture-based) control and other forms of control, such as voice control.

In some embodiments, the target device to be controlled may be a roadside sign, a vehicle, a smart vehicle controller, or may be a device (e.g., a remote server or other computing device) that communicates with a vehicle or smart vehicle controller, as further described herein. Unlike in conventional implementations of providing indications to a driver of, for example, pedestrians crossing in a crosswalk or an approaching emergency vehicle, the techniques described herein may allow a user of a control device, who may be located at any suitable remote location outside of the vehicle (including in a different vehicle), to perform a movement(s) (e.g., gesture(s)) so as to cause relevant and timely indications to be provided to the driver in an easily noticeable way(s). For example, and as discussed in further detail below, such indications may be provided by way of easily visible roadside signs near the driver, by a smart vehicle controller of the vehicle being driven, etc.

More generally, the target device that is controlled using a control device worn by the user may be any suitable device that receives (or that has a component coupled thereto that receives) a control signal directly or indirectly from the control device as described herein and that operates (e.g., is controlled) in response to the control signal, where the control signal may be generated as a result of the user performing a movement(s) (e.g., gesture(s)). Accordingly, the techniques, systems, and methods disclosed herein are able to provide a user with the ability to control a device from a distance, where the device to be controlled may be configured for such control without the need for an additional device such as a conventional remote control, and/or to perform device control in a way that provides a more effective indication or feedback to, for example, a driver of a vehicle. In view of these and other advantages that will be recognized by one of ordinary skill in the art in light of the teaching and disclosure herein, it will be appreciated that the techniques, systems, and methods described herein are directed to an improvement to computer functionality and/or an improvement in computer-related technology, and improve the functioning of conventional computers. Moreover, additional advantageous features and embodiments of techniques, systems and methods for movement-based device control are further described below.

FIG. 1 illustrates a block diagram of an exemplary system 100 for configuring a device for movement-based control and implementing movement-based device control, such as device control based on movement of a user as described herein. The high-level architecture illustrated in FIG. 1 may include both hardware and software applications, as well as various data communication channels or links for communicating data between the various hardware and software components, as is described below. The system 100 may include a user 102 of functionality described herein, a network 104, a remote computing device 106, an insurance provider computing device 108, and a data storage device (or devices) 110, it being understood from the teaching and disclosure herein that various components and/or devices shown and/or described in the singular may have plural instances or vice-versa, or may be omitted in some embodiments. The remote computing device 106 may be situated at any suitable or desired location remote from (e.g., not worn by or directly attached to) the user 102, as further described herein.

The system 100 may also include a watch 112, which in the example of FIG. 1 may be worn by the user 102 and may be a smart watch. Additionally or alternatively, the system 100 may include a necklace 114, which may also be worn by the user 102 and may in some embodiments include or be attached to a camera 116 or any suitable image sensor. For ease of explanation, the present disclosure refers at times to a "control device," and it will be understood in light of the teaching and disclosure herein that the control device may be the watch 112, the necklace 114 including the camera 116, and/or may be different devices at different times. For example, at a first time, the watch 112 may be used as the control device to implement functionality described herein, and at a second time, the necklace 114 including the camera 116 may be used as the control device to implement functionality described herein. Furthermore, it should be appreciated in light of the teaching and disclosure herein that a suitable additional and/or alternative device or devices may be worn by the user 102, held by the user 102, attached to the user 102, etc. and may constitute the control device, such as, for example, smart glasses. As an example, the user 102 may wear clothing with a sensor (or sensors) and/or other suitable hardware built in to the clothing, such as a sensor 117 built into the shirt of the user 102 as shown in FIG. 1. The user 102 may perform suitable movement as described elsewhere herein, which may be sensed by the sensor 117 and used to generate and transmit a control signal as described elsewhere herein. The sensor 117 may be or may include an image sensor and/or any other suitable type of sensor(s).

With reference to the discussion above, the user 102 may cause at least one movement to be associated with the control device in order to control operation of a target device in a desired and/or suitable manner. With further reference to the discussion above, the user 102 may cause the at least one movement to be associated with the control device by performing a movement(s) such as an arm and/or hand gesture(s). In some embodiments, the at least one movement associated with the control device may be the movement(s) performed by the user 102. In other embodiments, the at least one movement associated with the control device may be a movement(s) of the control device that results from the movement(s) performed by the user 102. For example, the user 102 may make a flicking motion with a finger of the user 102 (e.g., a motion that the user 102 would make with his or her finger to turn a light switch on or off), and the movement of the watch 112 that results from the flicking motion of the finger of the user 102 may constitute a movement associated with the control device. Stated another way, it will be understood in light of the present disclosure that the flicking motion (or any other suitable movement) made by the user 102 may not result in a movement of the watch 112 or other control device that has the same size, direction, and/or speed, etc. as the flicking motion, but may nonetheless correspond to a particular movement of the watch 112 or other control device (e.g., a movement of the watch 112 that is of a certain direction, distance, speed, etc.). Such a corresponding particular movement of the watch 112—as opposed to the actual flicking motion made by the user 102 wearing the watch 112—may constitute the movement associated with the control device as described herein.

In cases where another control device (or devices) is used, such as the necklace 114 with the camera 116, the user 102 may cause at least one movement to be associated with the control device by, for example, gesturing such that the gesture is captured by the camera 116 (which may capture still images, video, etc.). An indication of the gesture captured by the camera 116 may be further processed in a similar manner as an indication of a movement associated with the watch 112 may be processed, as described elsewhere herein.

As discussed in further detail herein, a control signal may be generated accordingly in response to the at least one movement associated with the control device (e.g., a movement of the control device resulting from a flicking motion performed by the user 102) so as to control operation of the target device. For example, and as also discussed in further detail herein, the control signal may be generated so as to raise a window shade when the target device is a window shade, so as to provide a particular command(s) to a smart vehicle controller, so as to provide particular data and/or command(s) to a remote computing device such as the remote computing device 106, etc. Data provided to the remote computing device 106 may in some examples be stored in the data storage device (or devices) 110 for retrieval at a desired or suitable time, such as to provide commands to one or more vehicles and/or smart vehicle controllers. In other examples, as further discussed herein, the control signal generated in response to the at least one movement associated with the control device may increase or decrease a setting (e.g., temperature, brightness, volume, channel such as in the case of a television, etc.) of the target device; may move the target device in a particular direction (e.g., moving a window shade up or down); and/or may control the target device in any other suitable manner. An example gesture that may be performed to increase or decrease a setting includes raising or lowering a hand and/or arm of the user 102. Example gestures that may be performed to move the target device in a particular direction include movement of a hand of the user 102 in particular directions (e.g., up to raise a window shade, down to lower a window shade, to the right to move the target device in one direction, to the left to move the target device in an opposing direction, and/or any other suitable gestures).

In some embodiments, it may be determined (e.g., by the control device, such as the watch 112) whether a particular user, such as one user of at least one authorized user of the control device, is the user 102 wearing the control device, and various actions described herein such as generation of the control signal may not be performed when an authorized user of the control device is not wearing the control device. As described in further detail below, the determination or detection of the control device being worn by an authorized user may be performed based on analyzing biometric information of the user 102 wearing the control device (which biometric information may be determined by the control device while the user 102 wears the control device) with respect to biometric information that has been associated with the at least one authorized user of the control device. In this manner, if the user 102 is not an authorized user of the control device, the user 102 may be unable to use the control device to control operation of any target device. Additionally or alternatively, in some embodiments, it may be determined whether the user 102 is an authorized user of the control device based on additional authentication information (e.g., authentication information other than biometric information), such as a username and/or password entered by the user 102 of the control device via, for example, a user interface of the control device.

In any event, in some embodiments, the particular movements that the user 102 is to cause to be associated with the control device so as to cause generation of a control signal to control a target device, as further described herein, may be programmed into the control device (e.g., a mobile application, such as that further discussed below, may execute according to such programming) and may be known only to the user 102. In such embodiments, the control device (e.g., the watch 112) may determine the particular movements that the user 102 is to cause to be associated with the control device so as to control the target device when the user 102 is authenticated as an authorized user as described herein, and the response (or lack of response) of the control device to movements of the user 102 in causing generation and transmission of a control signal, etc., may proceed accordingly.

In accordance with the techniques, systems, and methods disclosed herein, insurance coverage may be provided to the user 102 that rewards the user for controlling one or more target devices using a control device (e.g., the watch 112). For example, an insurance premium for coverage provided to the user 102 with respect to a residence may be decreased based on a number of times (and/or an amount of time and/or any other suitable measure(s)) that the user 102 uses the control device (and/or another control device(s), such as the necklace 114) to control operation of a target device that constitutes a smart home device (or a device that has been configured for movement-based device control as described herein), a home security device or system, and/or other device(s) or system(s) that, when used, reduce a risk of an insured loss (e.g., fire, burglary, flood, etc.) associated with a residence. Additionally or alternatively, in some examples, an insurance premium for coverage with respect to a vehicle may be decreased based on a number of times (and/or an amount of time and/or any other suitable measure(s)) a smart vehicle controller of the vehicle receives indications (e.g., of oncoming EMS vehicles, etc.) generated as a result of use of a control device by, for example, a different user outside of a vehicle being driven by the user 102. In some embodiments, as discussed below, such indications may be received by way of a target device that has been configured for movement-based device control performing an action (e.g., displaying a message) in response to control by the control device.

Data indicative of control signals generated by the control device or devices used by the user 102 in, for example, a residential context, the context of a vehicle, etc. may be sent to the insurance provider computing device 108 (e.g., an insurance provider server) and/or stored in the data storage device (or devices) 110. In other examples, any suitable data, such as data from the target device or devices controlled, data indicative of control commands corresponding to the control signals, data indicative of the at least one movement associated with the control device, etc. may additionally or alternatively be sent to the insurance provider computing device 108 and/or stored in the data storage device 110. Such data indicative of control signals and/or other suitable data may be used by an insurance provider associated with (e.g., owning, operating, controlling, and/or otherwise utilizing) the insurance provider computing device 108 in determining insurance incentives, rewards, etc. as further described below.

With continued reference to FIG. 1, example target devices are shown in the system 100, though it should be appreciated from the present disclosure that any suitable target device(s) may be implemented and controlled using the functionality described herein. More particularly, FIG. 1 illustrates the system 100 as including a stove 118 with four burners 120a-120d and four corresponding burner control knobs 122a-122d. The stove 118 may also include or be coupled to a stove communication mode control component 124, which may be or include an electronic switch or other suitable component that may cause the stove 118 to switch between operating in a manually-controlled mode (e.g., operating in response to manual control of the burner control knobs 122a-122d) and operating in a remotely-controlled mode (e.g., operating in response to a control signal generated by the watch 112 or other control device). For example, in the remotely-controlled mode, the stove 118 may operate based on receipt of the control signal via a communicative connection (e.g., a connection via a wireless communication link 126, as further described below). In some embodiments, the user 102 or another entity may couple the stove communication mode control component 124 (and/or any other components coupled to target devices as described herein, such as actuators) prior to movement-based device control to allow the stove 118 (and/or other target device or devices, such as a device(s) having an actuator(s) coupled thereto) to receive a movement-based control signal generated as described herein.

In some embodiments, the stove 118 may also be retrofitted with a communication control device, such as a stove communication control device 123 which may connect to the manual controls of the stove 118 (e.g., the burner control knobs 122a-122d) in any suitable manner, such as by being coupled to, for example, the burner control knob 122d as shown in FIG. 1. The stove communication control device 123 may facilitate the operation of the stove 118 in the remotely-controlled mode instead of operation of the stove 118 in the manually-controlled mode using the burner control knobs 122a-122d. Existing wiring of the stove 118, such as existing wiring connected to the burner control knobs 122a-122d, may also be rewired to facilitate operation of the stove 118 in the remotely-controlled mode. It will be appreciated in light of the teaching and disclosure herein that any other suitable target device or devices may also be retrofitted in a similar manner.

Figure 2:
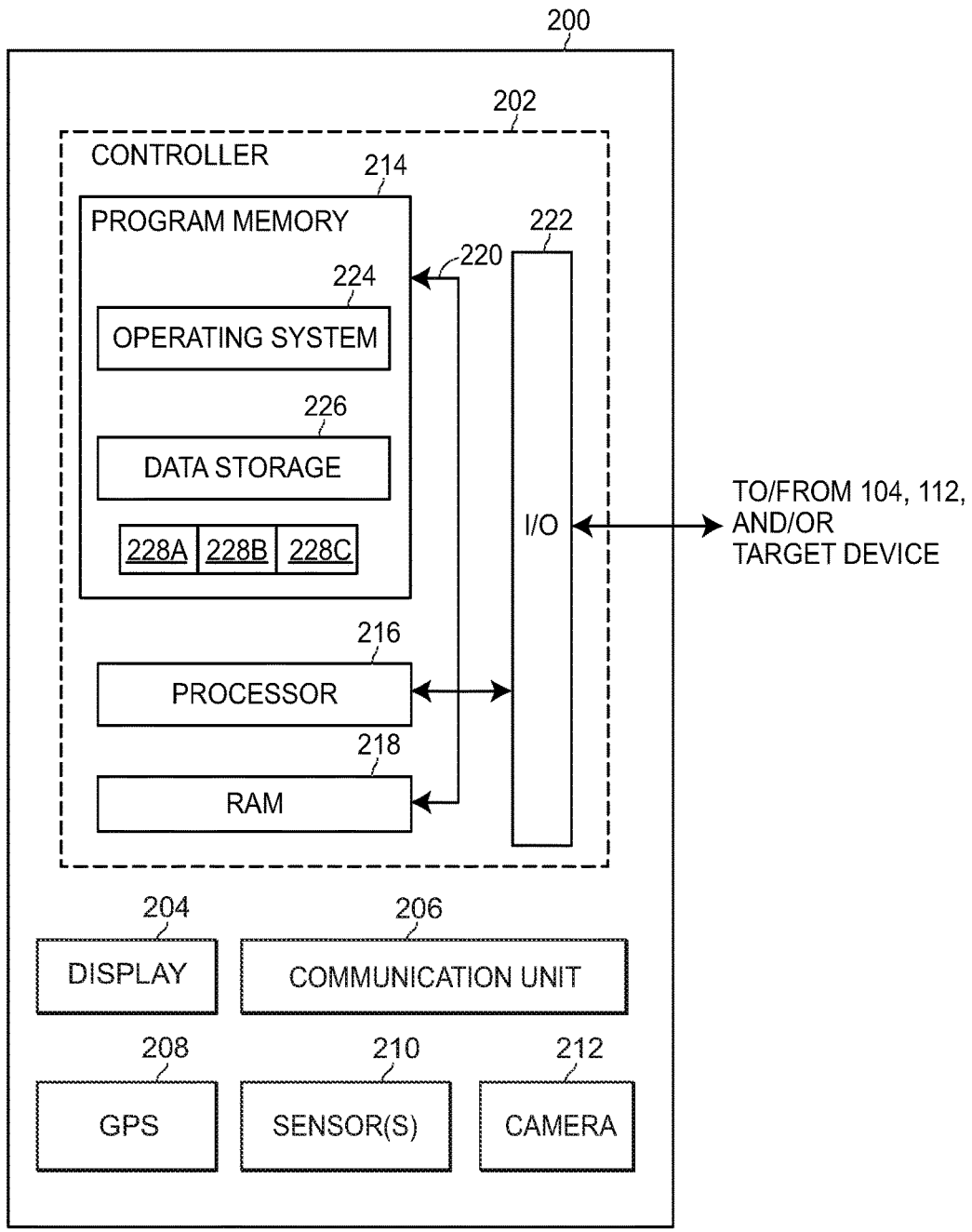
FIG. 2 illustrates a block diagram of a computing device according to an exemplary embodiment of the present invention.

The wireless communication link 126 may be established by the control device when, for example, the user 102 orients the control device to allow a transceiver thereof (e.g., a wireless transceiver of the watch 112, which as noted above may be a smart watch, and example components of which are described with respect to FIG. 2) to communicate with the target device (e.g., the stove 118) or a component associated with (e.g., coupled to) the target device, such as, for example, a mode control component or an actuator coupled to the target device as described herein. In the example of FIG. 1, the wireless communication link 126 is established between the watch 112 and a component associated with the target device, such as the stove communication mode control component 124 that is coupled to the stove 118. The control device may establish the wireless communication link 126 between the control device and the target device (or component coupled to the target device) using Wi-Fi communication, Bluetooth communication, GPS technology, infrared communication, line-of-sight communication, radar, a received signal strength indicator (RSSI), and/or any other suitable technique(s) and/or type(s) of communication.

More particularly, in some embodiments, the control device may establish the wireless communication link 126 in accordance with the Wi-Fi Direct standard without the need for a wireless access point. In other embodiments, the control device may establish the wireless communication link 126 using an additional device such as a wireless access point (not shown). In such embodiments, the wireless communication link 126 may be illustrative of communication occurring between the watch 112 and the stove communication mode control component 124, even though such communication, while shown as direct communication in FIG. 1, may instead be indirect communication via the wireless access point.

In embodiments where the control device establishes the wireless communication link 126 using GPS technology, the control device may, when oriented so that a transceiver thereof communicates with the target device (or component coupled thereto, it being understood that references herein to the "target device" may additionally or alternatively be references to a component coupled thereto, such as a mode control component and/or actuator), ping the target device. For example, the control device may send a suitable signal to the target device to ping the target device. The target device may transmit a signal indicative of its GPS coordinates to the control device, and the control device may in some embodiments store an indication of the GPS coordinates of the target device for use in communicating with the target device. For example, the stove communication mode control component 124 may be near another target device, and when the control device is oriented so as to transmit a control signal to the stove communication mode control component 124, the control device may use the GPS coordinates of the stove communication mode control component 124 to establish the wireless communication link 126 between the control device and the stove communication mode control component 124. In this manner, the control device may be configured to communicate with the stove communication mode control component 124 as opposed to communicating with another nearby target device. The control device (e.g., the watch 112) may indicate to the user 102 the target device with which the control device has the wireless communication link 126. For example, a display of the watch 112 may indicate to the user 102 (e.g., via a suitable written and/or graphical message) that the watch 112 has the wireless communication link 126 with the stove communication mode control component 124.

In some examples, multiple target devices may be indicated (e.g., on the display of the watch 112), such as multiple target devices that are known to be within transmission range of the watch 112 (or other control device) and that have been prepopulated or preprogrammed for display via the watch 112. Examples of additional target devices are further described below. In such embodiments, the user 102 may select from among the multiple target devices via the display and/or another suitable user interface. A different wireless communication link (e.g., other than the wireless communication link 126, as further described herein) between the control device and the selected target device may be established, such as by using the example techniques described herein.

In embodiments where the control device establishes the wireless communication link 126 using Bluetooth technology, infrared technology, and/or line-of-sight technology, the control device may establish the wireless communication link 126 with a target device or a component coupled thereto using any suitable techniques that will be recognized by one of ordinary skill in the art in light of the teaching and disclosure herein. For example, the watch 112 and/or a target device or component coupled thereto may perform any suitable actions necessary for Bluetooth pairing of the watch 112 with the target device or component, any suitable actions necessary to establish an infrared link between the watch 112 and the target device or component, any suitable actions necessary to establish a microwave or other line-of-sight communication link between the watch 112 and the target device or component, etc.

In embodiments where the control device establishes the wireless communication link 126 using radar, the control device may use techniques that will be recognized by one of ordinary skill in the art in light of the teaching and disclosure herein to transmit suitable radio frequency signals and detect radio waves reflected from the target device in order to determine an indication of a location of the target device based on the reflected radio waves. Similarly, in embodiments where the control device establishes the wireless communication link 126 using an RSSI, the control device may use techniques that will be understood by one of ordinary skill in the art in light of the teaching and disclosure herein to determine an indication of a location of the target device based on the RSSI. In any event, in various embodiments, the establishment of the wireless communication link 126 may be completed using one of the other techniques described herein, such as by using Wi-Fi.

In some embodiments, the control device (e.g., the watch 112) may transmit a signal in order to ping a target device or devices, and the target device or devices (or, once again, component(s) coupled thereto, as discussed elsewhere herein) may be configured (e.g., by way of suitable computer-executable instructions executable by a processor(s) of the target device or component(s) coupled thereto) to transmit a device identification signal in response to receiving the signal from the control device. Such a device identification signal may include, for example, data indicating the type of the target device, data indicating a location of the target device, data indicating communication capabilities of the target device (e.g., whether the target device has Bluetooth capability), and/or any other suitable data. Such data in the device identification signal may, in some embodiments, be used in conjunction with one or more of the various techniques described above in "pairing" the control device and the target device and/or in establishing the wireless communication link 126.

In some embodiments, the control device may additionally or alternatively use laser communication, light-emitting diode (LED) to LED communication, and/or any other suitable type(s) of communication to identify a target device, a type of the target device, a location of the target device, communication capabilities of the target device, etc. In some embodiments, the target device may include a component, such as a laser light or LED, that flashes or blinks in response to receiving a device identification signal such as that described above or in response to detecting laser or LED communication (e.g., a laser or LED illuminated at the control device). Such flashing or blinking may assist the user 102 of the control device in establishing the wireless communication link 126 with the particular target device intended by the user 102. In any event, the identified data regarding the target device, type of target device, location of target device, and/or communication capabilities of the target device, etc. may, in some embodiments, be used in conjunction with one or more of the various techniques described above in order to "pair" the control device and the target device and/or in establishing the wireless communication link 126.

In some embodiments, a user interface of the watch 112 or other control device may include an option(s) for the user 102 to verify, disable, and/or cancel the establishment of the wireless communication link 126 with the target device at any suitable time during or after the wireless communication link 126 is established. Furthermore, in some embodiments, the watch 112 or control device may execute a mobile application ("app") in establishing the wireless communication link 126. An example implementation of the watch 112 or other control device is further described with respect to FIG. 2. Additionally or alternatively, in some embodiments, a target device or component coupled thereto may perform at least some of the actions involved in establishing a communicative connection, such as at least some of the actions described herein that are involved in establishing the wireless communication link 126.

With reference to the discussion above, it may be determined whether the user 102 wearing the control device is an authorized user of the control device (e.g., a user authorized to cause at least one movement to be associated with the control device so as to generate a control signal to control a target device as described herein), such as based on biometric information of the user 102 and/or additional authentication information of the user 102. The watch 112 or other control device may store (e.g., by previous collection of biometric information from an authorized user(s) or other suitable input of such information) biometric information of one or more authorized users as expected biometric information. In various embodiments, such expected biometric information may include a resting heart rate of the user for whom expected biometric information is collected; a body temperature of the user for whom expected biometric information is collected; a heart rate of the user for whom expected biometric information is collected while the user walks; a manner in which the user for whom expected biometric information is collected moves his or her arms while walking; a manner in which the user for whom expected biometric information is collected positions his or her arms when in a seated position; a manner in which the user for whom expected biometric information is collected positions his or her arms while walking; and/or any other suitable biometric information. Such biometric information that may be stored as expected biometric information may be sensed and/or collected by, for example, one or more sensors of the watch 112 or other control device.

Biometric authentication of the user 102 may be performed by the watch 112 or other control device sensing and/or collecting biometric information of the user 102, such as one or more of the example types of biometric information discussed above. It may be determined, such as by a processor of the watch 112, whether the biometric information of the user 102 matches the expected biometric information discussed above. It should be appreciated in light of the teaching and disclosure herein that the expected biometric information as discussed above may include biometric information of multiple users, such as all users authorized to use the watch 112 as the control device. Accordingly, it may be determined that the biometric information of the user 102 matches the expected biometric information if the biometric information of the user 102 matches a portion of the expected biometric information that corresponds to one of the authorized users of the watch 112. In some embodiments, the user 102 may provide identifying information, such as a name, username, and/or password, in order to indicate with respect to which portion of the expected biometric information (i.e., the expected biometric information for which authorized user) the biometric information of the user 102 is to be analyzed to determine whether a match exists.

In some embodiments, the sensed and/or otherwise collected or measured biometric information of the user 102 may be determined to match the expected biometric information if the biometric information of the user 102, and/or one or more individual components (e.g., resting heart rate) of the biometric information of the user 102, is/are within a particular (e.g., predetermined and/or preprogrammed) range of the expected biometric information. The particular range may be a percentage range, for example.

In some embodiments, each authorized user may wear the watch 112 (or other control device) periodically (e.g., at predetermined or random intervals) in order for the watch 112 to sense and/or collect types of biometric information that constitute the expected biometric information for the authorized user. The expected biometric information for each authorized user may thus be periodically changed and/or updated.

In some embodiments, if it is determined that the biometric information of the user 102 is outside of a "profile" of the expected biometric information (e.g., outside of the particular range with respect to the expected biometric information for the user 102 or, for example, outside all particular ranges with respect to all portions of the expected biometric information for all authorized users), additional authentication may be performed. For example, the user 102 may use functionality of the control device to take a picture of his or her face for analysis, using facial recognition techniques, with respect to stored facial image information of authorized users of the control device in order to determine if the user 102 is an authorized user of the watch 112 or other control device. Additionally or alternatively, the user 102 may provide a fingerprint input, a username and/or password, and/or any other suitable additional authentication information to allow a processor of the watch 112 or other control device to determine if the user 102 is an authorized user of the watch 112 or other control device.

In some embodiments, the user 102 may be prompted to enter additional authentication information such as that described herein after the biometric information of the user 102 is determined to match the expected biometric information. That is, both the biometric information of the user 102 and the additional authentication information of the user 102 may need to match expected biometric information and expected additional authentication information (e.g., a stored username and password combination, etc.) for the user 102 to be able to use functionality of the watch 112 or other control device.

The user 102 may perform an "unlock" operation with respect to the control device, which in various embodiments may be part of authentication of the user 102 based on biometric information (and/or based on additional authentication information) or which may be performed before or after such authentication. In some embodiments, such as those where the unlock operation is performed before or after biometric authentication, the unlock operation may be performed by way of the user 102 providing a particular input (e.g., touching a particular physical or on-screen button of the watch 112) or series of inputs, which may be tactile, spoken, and/or any form of input(s). The particular input or series of inputs that is used to perform the unlock operation may be known only to authorized users, thus providing a further layer of security against unauthorized use of the watch 112 or other control device to control a target device(s).

Where the unlock operation is performed as a part of biometric authentication of the user 102, the unlock operation may be performed and functionality of the watch 112 (or other control device), such as functionality that causes the watch 112 to be operative to generate and transmit a control signal to a target device (or, once again, a component coupled thereto, as discussed elsewhere herein) (e.g., via the wireless communication link 126), may be enabled when the biometric information of the user 102 matches the expected biometric information. In any event, in some embodiments, the watch 112 (or other control device) may not allow performance of the unlock operation and/or may not allow selection of a target device, generation and/or transmission of the control signal, etc. when the watch 112 is not being worn by a person, such as the user 102, and/or when the watch 112 is not worn correctly (e.g., on a wrist). It may be determined whether the watch 112 is being worn using suitable sensors of the watch 112 and/or using a mobile application (such as the same mobile application used in establishing the wireless communication link 126), which sensors may be or include sensors that are the same as and/or different from sensors used to sense and/or collect the biometric information of the user 102.

Additionally or alternatively, in some embodiments, one or more authorized users (e.g., the user 102) may be able to control any target device within range of the watch 112 or other control device, while one or more other authorized users may be able to control one or more, but less than all, target devices within range of the watch 112 or other control device. Such a restriction(s) on control of target devices may be implemented by, for example, the watch 112 (e.g., using a mobile application executing thereon) and/or by one or more of the target devices. For example, the target device(s) may receive(s), as part of a control signal, an indication of an identity of a user (e.g., a user other than the user 102 who is able to control less than all target devices) who performs one or more movements resulting in generation of the control signal. The target device may store an indication(s) of a user(s) authorized to control the target device, and/or the control signal may further indicate whether the indicated user is authorized to control one or more particular target devices.

With continued reference to FIG. 1, additional example target devices may include window shades of a first window 128 and a second window 130. In particular, the first window 128 may have a first window shade 132 associated therewith and the second window 130 may have a second window shade 134 associated therewith. The first window shade 132 may have a first window shade actuator 136 coupled thereto, and the second window shade 134 may have a second window shade actuator 138 coupled thereto. Each of the first window shade actuator 136 and the second window shade actuator 138 may be any suitable type of actuator such as, for example, an actuator with suitable electronics for receiving a control signal generated by the control device as described herein and causing the respective window shade (i.e., the first window shade 132 or the second window shade 134) to operate based on the received control signal. In this manner, a device that is not equipped with, for example, an electronic switch to allow receipt of a signal to cause the device to operate in a remotely-controlled mode (as further described herein) or a device that is not otherwise "smart" and configured to operate in response to the control signal generated by a control device may be configured with "smart" or other appropriate functionality for movement-based (e.g., gesture-based) control using, for example, an actuator as described herein. As discussed above, a mode control component such as the stove communication mode control component 124 may also be coupled to a target device to configure a target device for movement-based control as described herein.

It will be appreciated in light of the teaching and disclosure herein that any suitable device may be configured for movement-based control by a remotely-located control device, and that the stove 118, the first window shade 132, and the second window shade 134 are merely examples. Among other examples, while not shown as such in FIG. 1, the first window 128 and/or the second window 130 may themselves be target devices. Suitable components such as actuators similar to the first window shade actuator 136 and/or the second window shade actuator 138 may be coupled to the first window 128 and/or the second window 130 to facilitate movement-based control of the first window 128 and/or the second window 130.

In any event, FIG. 1 shows an additional communication link 140, such as an additional wireless communication link (though it will be understood from the present disclosure that the wireless communication link 126 need not be established in various examples) between the watch 112 and the first window shade actuator 136. The additional communication link 140 may be established in one or more of the manners similar to those described with respect to establishment of the wireless communication link 126. It will be further understood from the present disclosure that other communication links may be established between the watch 112 (or other control device, such as the necklace 114 or camera 116 attached thereto) and another target device or devices or component(s) coupled thereto. For example, another communication link (not shown) may be established between the watch 112 and the second window shade actuator 138.

Referring now to further examples of target devices, FIG. 1 shows a door 142 with a door actuator 144 coupled thereto. The door actuator 144 may be any suitable type of actuator, such as described above with respect to the first and second window shade actuators 136 and 138. For example, the door actuator 144 may control opening of the door 142, closing of the door 142, locking of the door 142, and/or unlocking of the door 142 depending on the control signal(s) received by the door actuator 144. Moreover, it will be appreciated in light of the teaching and disclosure herein that the door 142, and/or any other devices that may be coupled to actuators as described herein, may be a manually-operated door (or other device(s)) that is retrofitted with an actuator (e.g., the door actuator 144) or may be manufactured to connect to an actuator (e.g., the door actuator 144). Additionally or alternatively, the door actuator 144 and/or any other actuators described herein may be manufactured with, for example, one or more suitable processors and/or switching components so as to receive control signals from the watch 112 or other control device and cause corresponding control of the target device to which such an actuator(s) is coupled. In some embodiments, one or more processors and/or electronic switches, for example, that may be associated with an actuator may constitute or may be included in a communication control device instead of within or as part of the actuator. For example, such a communication control device may be a door communication control device 145, which may be coupled to the door actuator 144 as shown in FIG. 1.

As will be further appreciated from the teaching and disclosure herein, while the first and second window shade actuators 136 and 138 and the door actuator 144 are shown coupled to their respective target devices, any suitable components may be configured to receive a control signal from a control device and may be coupled to respective target devices. With respect to the door actuator 144, a communication link (not shown) may be established, such as in one or more of the manners described with respect to establishment of the wireless communication link 126, between the watch 112 (or other control device) and the door actuator 144 to facilitate the movement-based device control described herein.

FIG. 1 also illustrates a light fixture 146 that may communicate with the watch 112 (or other control device) as described herein. For example, the user 102 (e.g., after unlocking the watch 112 and/or being authenticated) may make a flicking motion up or down with his or her finger to cause a movement to be associated with the watch 112 that results in generation of a control signal which, when received by the light fixture 146, turns the light fixture on or off. In other embodiments, the user 102 may perform other suitable gestures, such as raising his or her hand to brighten or dim the lighting provided by the light fixture 146. FIG. 1 further shows a light switch panel including an on/off light switch 148 and a dimmer switch with a dimmer 150. In one embodiment, each of the on/off light switch 148 and the dimmer 150 may be configured to receive control signals from the watch 112 based on a gesture or gestures performed by the user 102. The on/off light switch 148 may, in response to a control signal or signals received, control the on/off status of a light (not shown, or in some embodiments the light fixture 146). The dimmer 150 may, in response to a control signal or signals received, control the brightness of a light (not shown, or in some embodiments the brightness of lighting provided by the light fixture 146). Additional examples of target devices include smart meters, such as thermostats, and FIG. 1 shows an example smart thermostat 151. The smart thermostat 151 may, in response to a control signal or signals received, adjust a temperature of one or more rooms and/or areas of a residence, adjust time(s) at which one or more rooms and/or areas of a residence have particular temperature settings, and/or perform any other suitable or desired actions. It should be understood in light of the teaching and disclosure herein that while FIG. 1 shows example target devices, as noted above, any suitable target device or devices may be controlled using the techniques described herein.

Furthermore, with regard to target devices capable of operating in a manually-controlled mode or a remotely-controlled mode (e.g., the stove 118), the control device may send a mode change signal to such target devices (or component(s) coupled thereto) to cause such target devices to change between operating modes. The mode change signal may be any suitable signal generated by, for example, the watch 112 which, when received by a target device or a component coupled thereto, causes the target device to switch from operating in the manually-controlled mode to operating in the remotely-controlled mode or vice versa. The component coupled to a target device that may receive the mode change signal, such as the stove communication mode control component 124, may be or may include an electronic switch that is activated in response to the mode change signal in order to change the operating mode of the target device coupled thereto.

FIG. 1 still further shows a traffic light 152 and a roadside sign 154. One or more of the traffic light 152 or the roadside sign 154 may be a roadside infrastructure component(s) equipped with "smart" functionality, such as functionality that allows receipt and processing of a control signal transmitted by a control device. For example, the roadside sign 154 shows an example message of "CROSSING" which may be used to indicate a road crossing. For example, a pedestrian (who may be the user 102); a crossing guard (who may alternatively be the user 102, or who may be a different user in some examples); and/or any suitable person, such as a driver of a vehicle, may perform one or more movements while wearing the watch 112 or other control device to cause display of the "CROSSING" message to warn oncoming vehicles and/or drivers of a pedestrian crossing. In some embodiments, such a movement(s) by the same or a different person may additionally or alternatively cause changing of the traffic light 152 to red to provide an indication to traffic to stop for the pedestrian crossing. In other embodiments, a movement(s) by a person such as the user 102 (e.g., as a driver) may cause the traffic light 152 to change color in another manner, such as from red to green. Still further, the roadside sign 154 may be configured to receive and process a control signal from a control device that may cause a different message to be displayed aside from "CROSSING," such as a message regarding estimated transit times to various local destinations from the position of the roadside sign 154, or in some examples no message.

FIG. 1 further shows a first vehicle 158 and a second vehicle 160 traveling on a road 162. The first vehicle 158 may be equipped with a first on-board computer and/or smart vehicle controller 164 (at times referred to herein as a "first smart vehicle controller 164" for ease of explanation), and the second vehicle 160 may be equipped with a second on-board computer and/or smart vehicle controller 166 (at times referred to herein as a "second smart vehicle controller 166" for ease of explanation). In some embodiments, one or both of the first vehicle 158 and the second vehicle 160 may be an autonomous or semi-autonomous vehicle. In some embodiments, the control device used to, among other things, generate and transmit a control signal to the traffic light 152 and/or the roadside sign 154 may be or include one or more of (i) the first vehicle 158 (or one or more components thereof, such as one or more suitable wearable control devices or other computing devices therein); (ii) the second vehicle 160 (or one or more components thereof, such as one or more suitable wearable control devices or other computing devices therein); (iii) the first smart vehicle controller 164; and/or (iv) the second smart vehicle controller 166. As an example, FIG. 1 illustrates a communication link 168 between the first smart vehicle controller 164 and the traffic light 152, over which the first smart vehicle controller 164 (e.g., acting as a control device) may transmit a control signal to the traffic light 152.

As another example, a driver of a vehicle (e.g., the user 102 as the driver of the first vehicle 158) may perform one or more suitable movements to cause the watch 112 or other control device to transmit a control signal to the first smart vehicle controller 164 to control one or more functions of the first vehicle 158. Control of one or more functions of a vehicle such as the first vehicle 158 in this manner may provide various advantages, such as allowing the driver of the first vehicle 158 to control functions of the first vehicle 158 that would otherwise have been controlled using voice commands when use of voice commands is not desired (e.g., because a child or other passenger within the first vehicle 158 is resting or sleeping).

Additionally or alternatively, in some embodiments, the first vehicle 158 (or component(s) thereof), the second vehicle 160 (or component(s) thereof), the first smart vehicle controller 164, and/or the second smart vehicle controller 166 may act as a control device(s) that generate and transmit a control signal(s) to the remote computing device 106 (e.g., via the network 104 as shown in FIG. 1), the first vehicle 158, the second vehicle 160, the first smart vehicle controller 164, the second smart vehicle controller 166, and/or any other suitable components and/or computing devices. Such functionality may allow various components such as those shown in FIG. 1 to provide messages and/or other suitable indications to other components such as those shown in FIG. 1 in the context of vehicles, such as an indication that a pedestrian(s) is/are crossing the road 162 via a crosswalk 170.

FIG. 2 illustrates a block diagram of an exemplary computing device 200. The computing device 200 may be an implementation of one of the computing devices shown and described with respect to FIG. 1, and more than one of the computing devices shown and described with respect to FIG. 1 may be implemented in accordance with the computing device 200. For example, the remote computing device 106; the insurance provider computing device 108; the watch 112; the sensor 117; the stove communication control device 123; the stove communication mode control component 124; the first and second window shade actuators 136 and 138; the door actuator 144; the door communication control device 145; the light fixture 146; the on/off light switch 148; the dimmer 150; the smart thermostat 151; the traffic light 152; the roadside sign 154; the first smart vehicle controller 164; the second smart vehicle controller 166; and/or any other suitable components such as those shown in FIG. 1 may be implemented in accordance with, or may include components implemented in accordance with, the computing device 200.

The computing device 200 (and thus any of the aforementioned components or other suitable components that may be implemented in accordance with the computing device 200) may include a controller 202, a display 204, a communication unit 206, a GPS unit 208, one or more sensors 210 (e.g., a heart rate sensor and/or other biometric sensors, a motion sensor(s), a gyroscope(s), and/or any other suitable sensor(s)), and a camera 212. The display 204 may provide and/or receive output and/or input to, for example, the user 102 regarding, for example, establishment of a communication link, target devices to select from, authentication processes, etc. The communication unit 206 may communicate with other computing devices, such as other devices shown in FIG. 1 (e.g., target devices or components coupled thereto, the watch 112 or other control device, the network 104 in order to communicate with the remote computing device 106, the insurance provider computing device 108, and/or the data storage device(s) 110, etc.). In various embodiments, the communication unit 206 may communicate via Wi-Fi, WiMAX, Bluetooth, infrared, microwave, and/or other suitable communication techniques. The communication unit 206 may also or alternatively be used in radar applications, such as described above with respect to establishment of the wireless communication link 126. The communication unit 206 may in some embodiments provide input signals to the controller 202, and/or may transmit sensor data from the sensor(s) 210, GPS data from the GPS unit 208, image and/or video data, etc. from the camera 212, and/or any other suitable data to one or more other devices, such as one of the example devices shown in FIG. 1.

The controller 202 may include a program memory 214, a processor 216 such as a microcontroller or a microprocessor, a random-access memory (RAM) 218, an address/data bus 220, and an input/output (I/O) circuit 222. The address/data bus 220 may connect the program memory 214, the processor 216, the RAM 218, and the I/O circuit 222. In some embodiments, the communication unit 206, while illustrated separately from the I/O circuit 222, may be integral with the I/O circuit 222 so that the I/O circuit 222 may provide the functionality described above with respect to the communication unit 206. The program memory 214 may include an operating system 224, data storage 226, and/or one or more software applications (e.g., mobile applications), which software applications are shown in the example of FIG. 2 as software applications 228A, 228B, and 228C. The operating system 224 may include one or more general purpose and/or mobile platforms, such as the Android™, iOS®, or Windows® systems, developed by Google Inc., Apple Inc., and Microsoft Corporation, respectively. In some embodiments, the operating system 224 may be a custom operating system designed for the computing device 200. The data storage 226 may include data such as expected biometric information, expected additional authentication information, indications of particular movements for one or more particular users (e.g., movements known only to such a particular user(s) and thus resulting in control of a target device only when such a particular user(s) performs such movements), and/or any other suitable data in accordance with the functionality described herein. One or more of the software applications 228A-228C may be used in performing various operations for implementing the techniques and functionality described herein.

It should be appreciated that although FIG. 2 depicts only one processor 216, the controller 202 may include multiple processors 216. Additionally, although FIG. 2 depicts the I/O circuit 222 as a single block, the I/O circuit 222 may include a number of different types of I/O circuits (not depicted). The program memory 214, the RAM 218, and the data storage 226 may be implemented in any known form of non-transitory computer readable storage media, including but not limited to semiconductor memories, magnetically readable memories, and/or optically readable memories. It should also be appreciated that the example computing device 200 may include additional, fewer, or alternate components.

With reference to FIGS. 1 and 2, the network 104 may be or may include a network of the insurance provider (e.g., provided or used by the insurance provider or communications over which the insurance provider otherwise controls or facilitates). In various embodiments, processors of the devices communicatively coupled to the network 104 may execute instructions to transmit data to, receive data from, or otherwise communicate with other ones of the devices communicatively coupled to the network 104 (e.g., via a communication unit such as the communication unit 206, which as noted above may be integral with the I/O circuit 222). In various embodiments, such communication may include, but not be limited to, transmitting and/or receiving data regarding a control signal or signals generated by the watch 112 or other control device (e.g., via the communication unit 206), data regarding usage of the watch 112 or other control device to control a target device(s), etc. The network 104 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 104 may also or alternatively be or include one or more cellular networks such as a CDMA (code division multiple access) network, GSM (Global System for Mobile Communications) network, WiMAX (Worldwide Interoperability for Microwave Access) network, LTE (Long Term Evolution) network, etc.

Figure 3:
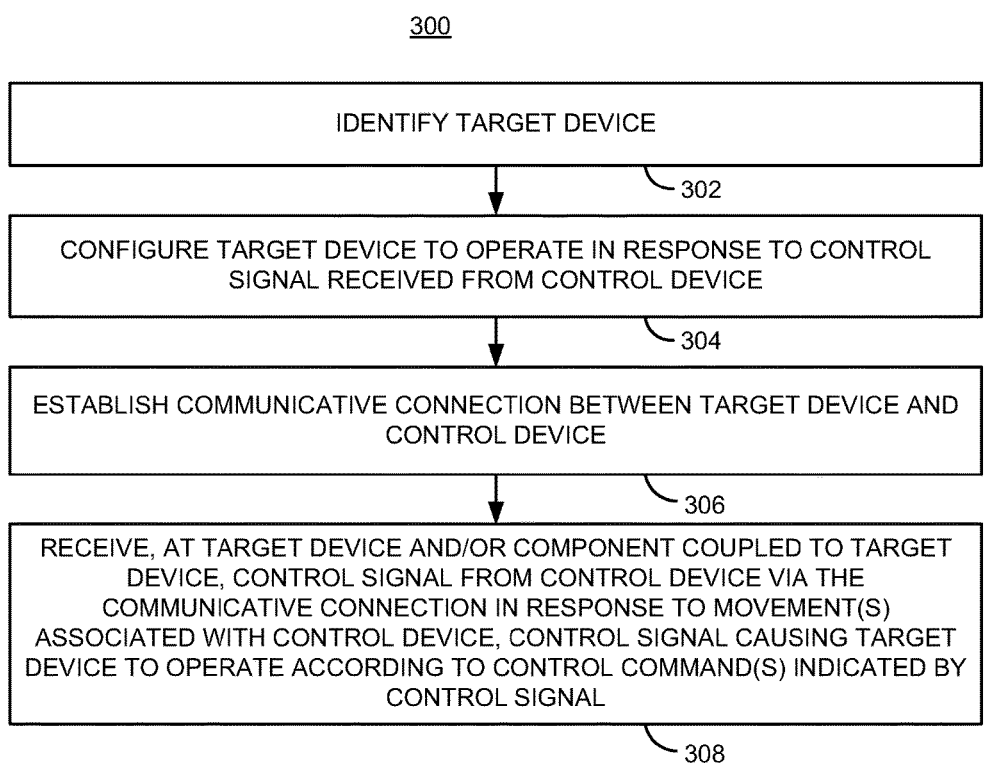
FIG. 3 illustrates a flow diagram of a method for configuring a target device for movement-based control, according to an exemplary embodiment of the present invention.

FIG. 3 illustrates a flow diagram of an exemplary method 300 for configuring a target device for movement-based control, such as for configuring one of the target devices described with respect to FIG. 1 for movement-based control with the watch 112 (or the necklace 114 and/or the camera 116) as a control device. At least a portion of the method 300 (and at least a portion of each of the exemplary methods described herein) may be performed by and/or using components of the system 100. As such, the method 300 (and each of the exemplary methods described herein) is described herein with respect to the system 100 for ease of explanation, and not by way of limitation. It will be appreciated in view of the teaching and disclosure herein that at least some portions of the method 300 (and at least some portions of each of the exemplary methods described herein) may be performed by or using another system(s) and/or by or using one or more components not shown in FIG. 1.

The method 300 may include identifying a target device (block 302). For example, the target device, such as the first window shade 132, may be identified by the user 102 and an indication of the first window shade 132 as the target device may be entered into the watch 112 (or other control device) via a suitable user interface. Additionally or alternatively, with reference to the discussion elsewhere herein, a target device with which the watch 112 (or other control device) may communicate for movement-based control purposes may be determined and indicated (e.g., selected) via a user interface of the watch 112.

The method 300 may also include configuring the target device to operate in response to a control signal received from a control device (e.g., the watch 112) (block 304). As discussed in detail above, configuring the target device may include coupling a component such as a communication mode control component (e.g., the stove communication mode control component 124 when the target device is the stove 118) to the target device. The communication mode control component may be or include an electronic switch or other suitable component which, upon receipt of a mode change signal, may cause the target subsystem to switch (and more specifically, may cause the target device to switch) between operating in a manually-controlled mode and operating in a remotely-controlled mode (e.g., operating in response to a control signal generated by the watch 112). As another example, and as also discussed in detail above, configuring the target device may include coupling a component such as an actuator (e.g., the first window shade actuator 136), which may include one or more processors and/or transceivers, to the target device. The actuator may be configured to receive and process a mode change signal similar to that described above and may, for example, in response to receiving and processing the mode change signal, enable the actuator to receive a control signal(s) as described herein so that, for example, the first window shade 132 operates in the remotely-controlled mode.

The method 300 may additionally include establishing a communicative connection between the target device and the watch 112 (or other control device) (block 306). The communicative connection may be established using one or more of the techniques described with respect to establishment of the wireless communication link 126. More particularly, one or more of the techniques described above with respect to establishment of the wireless communication link 126 may be utilized in establishing a communication link between, for example, the watch 112 and any suitable component (e.g., actuator) coupled to a target device so as to establish the communicative connection between the target device and the watch 112.

The method 300 may further include receiving, at (i) the target device and/or (ii) a component coupled to the target device, the control signal from the watch 112 or other control device via the communicative connection established as described with respect to block 306 in response to at least one movement associated with the watch 112 or other control device (block 308). The control signal may cause the target device to operate according to at least one control command indicated by the control signal. The control command(s) may be determined by the target device and/or by a component coupled thereto so that the target device and/or the component coupled thereto may cause the control command(s) associated with the target device and/or the component coupled thereto to be executed so that the target device is controlled according to the control command(s).

As discussed in detail above, the at least one movement associated with the watch 112 may be a movement(s) made by the user 102 or may correspond to a movement(s) made by the user 102 but may differ from the movement(s) made by the user 102. The at least one movement associated with the watch 112 may correspond to a particular control command(s) for a particular manner of control of the target device (e.g., with such a correspondence being known only to the user 102 (and in some cases to the watch 112 and/or the target device, as discussed below) and not to other users).

In some embodiments, the watch 112 may generate the control signal in response to the at least one movement associated with the watch 112 only after authentication of (and thus determination of the identity of) the user 102, and only when the authenticated user 102 performs a movement(s) that, based on data stored in memory of the watch 112, is a movement(s) specifically corresponding to the user 102 (e.g., known by the user 102 and not by other users). In this manner, it may be verified that the movement(s) performed by the user 102 correspond(s) to a particular control command(s) for the user 102. The same movement(s) may, in some examples, not correspond to any particular control command(s) for a different user, and thus in some embodiments, if a user other than the user 102 is determined to be wearing the watch 112, the watch 112 may not generate the control signal to be received at the target device and/or at the component coupled to the target device. In any event, when the control signal is generated for receipt by the target device and/or the component coupled to the target device, the control signal may encode or otherwise suitably indicate the at least one control command that may correspond to the movement(s) performed by the user 102.

While the description of the method 300 has included references to particular target devices, particular components coupled thereto, and particular manners of controlling such target devices (e.g., the stove 118, the stove communication mode control component 124, the first window shade 132, and the first window shade actuator 136), it should be understood that the method 300 may be performed with respect to any suitable target devices, components coupled thereto, and/or particular manners of control. For example, the method 300 may also or alternatively be performed with respect to the second window shade 134, the door 142, the light fixture 146, the on/off light switch 148, the dimmer 150, etc. As further examples, the method 300 may also or alternatively be performed with respect to, as a target device or devices, a device located on and/or within an exterior of a structure, such as a satellite dish mounted on an exterior of a residential structure; a television; any other suitable entertainment device; a lamp; an oven; a dishwasher; a refrigerator; a freezer; a microwave oven; a water fixture such as a faucet; a washing machine; a dryer; a thermostat; a storage device such as a storage crate or locker; a sign such as the roadside sign 154; an infrastructure component (e.g., the traffic light 152) that is on-road (e.g., on or directly above the road 162); an infrastructure component that is off-road (e.g., not positioned on or directly above the road 162); the first vehicle 158; the second vehicle 160; another control device (which may be, for example, the remote computing device 106 when the remote computing device 106 receives the control signal and then transmits another control signal to another target device based on the initially received control signal); a security device such as a device of a home security system; a computing device such as a computing device located in a residence; and/or any other suitable target device(s) including a suitable target device(s) not shown in FIG. 1.

Figure 4:
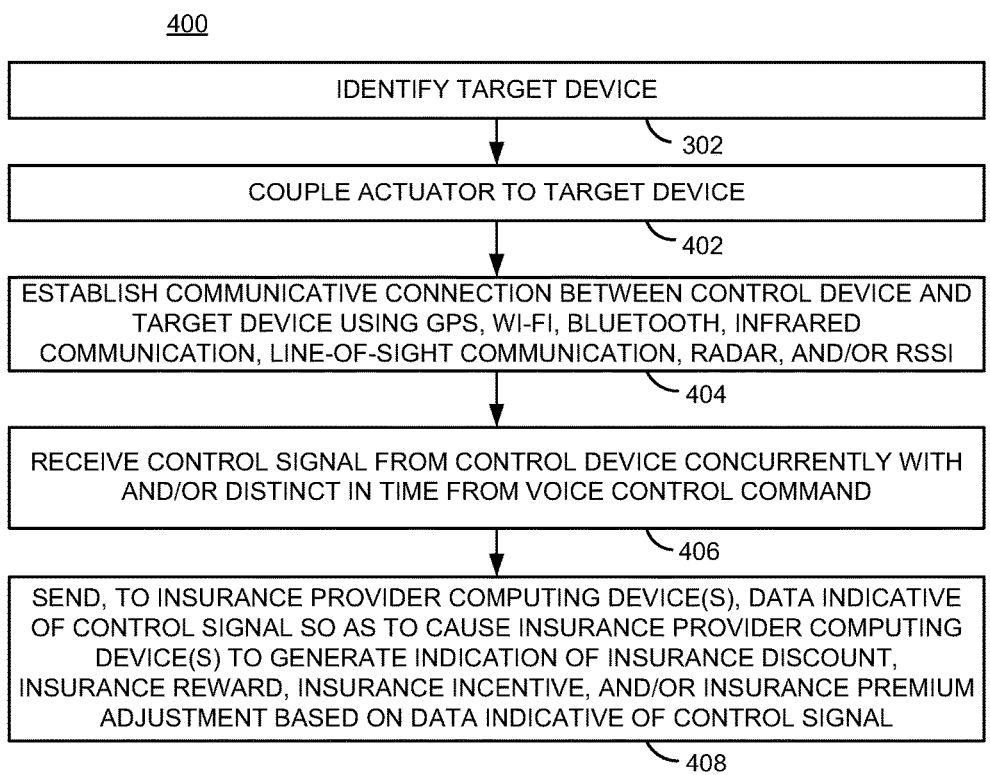
FIG. 4 illustrates a flow diagram of another method for configuring a target device for movement-based control, according to an exemplary embodiment of the present invention.

FIG. 4 illustrates a flow diagram of another exemplary method 400 for configuring a target device for movement-based control, such as for configuring one of the target devices described with respect to FIG. 1 for movement-based control with the watch 112 (or the necklace 114 and/or the camera 116) as a control device. As will be appreciated from the teaching and disclosure herein, aspects of the method 400 may correspond to a more detailed implementation(s) of aspects of the method 300, and may include additional actions relative to those described with respect to the method 300.

The method 400 may include performing the actions described with respect to block 302 to identify a target device for movement-based control purposes. The method 400 may also include coupling an actuator to the target device (block 402). For example, the user 102 and/or another suitable entity may couple the first window shade actuator 136 to the first window shade 132 by appropriate positioning of the first window shade actuator 136, such as that shown in FIG. 1, by appropriate connection of the first window shade actuator 136 to the first window shade 132, etc. It will be appreciated in light of the teaching and disclosure herein that the actions described with respect to block 402 may be a more particular implementation of the actions described with respect to block 304.

The method 400 may further include establishing a communicative connection between the watch 112 or other control device and the target device using GPS technology, Wi-Fi communication, Bluetooth communication, infrared communication, line-of-sight communication, radar, and/or an RSSI (block 404). For example, the communicative connection between the watch 112 and the target device may be established using one or more of the foregoing techniques in the manner(s) described in detail above with respect to establishment of the wireless communication link 126. It will be appreciated in light of the teaching and disclosure herein that the actions described with respect to block 404 may be a more particular implementation of the actions described with respect to block 306.

The method 400 may further include receiving the control signal from the watch 112 (or other control device) at the target device concurrently with receiving a voice control command causing the target device to operate according to the voice control command or distinct in time from receiving the voice control command (block 406). For example, the target device may be the first window shade 132, and the first window shade 132 may be configured with additional (e.g., "smart") functionality that allows the first window shade 132 to be raised and lowered in response to corresponding voice control commands and/or in response to a control signal received at the first window shade actuator 136 from a control device such as the watch 112. As noted above, movement-based (e.g., gesture-based) control of a target device such as the first window shade 132 may be preferred by the user 102, particularly in circumstances such as the presence of a significant volume of other sound in the vicinity of the user 102 that may make issuing the voice control command to the first window shade 132 difficult. The user 102 may also or alternatively desire to switch between controlling the target device (e.g., the first window shade 132) based on a voice control command(s) and based on a control signal(s) generated by the watch 112 or other control device. Thus, the first window shade 132 or other target device may be controlled according to a control signal from the watch 112 during a first time interval that is distinct from a second time interval in which a voice control command causes the target device to be controlled.

In some embodiments, the user may perform movement-based control of the target device and issue a voice control command(s) concurrently. In such embodiments, a processor(s) of the target device (and/or of a component coupled thereto, such as a processor(s) of an actuator) may interpret the resulting movement-based control signal(s) and voice control command(s). The processor(s) may, for example, resolve any conflicts between the control signal(s) and the voice control command(s) based on any suitable predetermined rule or rules, such as a rule giving preference to a control signal(s) generated using the movement-based device control techniques described herein.

The method 400 may additionally include sending, to one or more insurance provider computing devices (e.g., the insurance provider computing device 108, which may be an insurance provider server), data indicative of the control signal so as to cause the one or more insurance provider computing devices to generate an indication of an insurance discount, an insurance reward, an insurance incentive, and/or an insurance premium adjustment (block 408). The indication of the discount, reward, incentive, and/or premium adjustment may be generated based on the data indicative of the control signal. More particularly, and with reference to the discussion above, insurance coverage may be provided to the user 102 that rewards the user 102 for controlling one or more target devices as described herein. For example, the indication described with respect to block 408 may be an indication of a discount (e.g., a one-time reduction in premium or other suitable discount), a reward (e.g., an affinity offer or other suitable reward), an incentive (e.g., an indication of a further number of times and/or amount of time the user 102 needs to use the functionality described herein to control a target device(s) in order to receive a discount, reward, and/or premium adjustment, or another suitable incentive), and/or a premium adjustment (e.g., a premium reduction) provided based on use of the watch 112 or other control device to generate control signals.

More specifically, in some embodiments, the indication of the discount, reward, incentive, and/or premium adjustment may be provided based on a number of times, amount of time, etc. that the user 102 uses the watch 112 (or other control device) to perform control of a target device as described herein. Such an indication of a discount, reward, incentive, and/or premium adjustment may be provided because, in some situations, the insurance provider may determine that increased use of the device control techniques described herein reduce a risk of fire, burglary, etc., such as by regulating when doors are closed and/or locked, when temperatures are increased and/or decreased, etc. Accordingly, as described with respect to block 408, data indicative of a control signal or signals generated by the control device may be sent to the insurance provider computing device(s) so as to allow the insurance provider associated therewith to determine a discount(s), reward(s), incentive(s), and/or premium adjustment(s) to offer or provide to the user 102.

Figure 5:
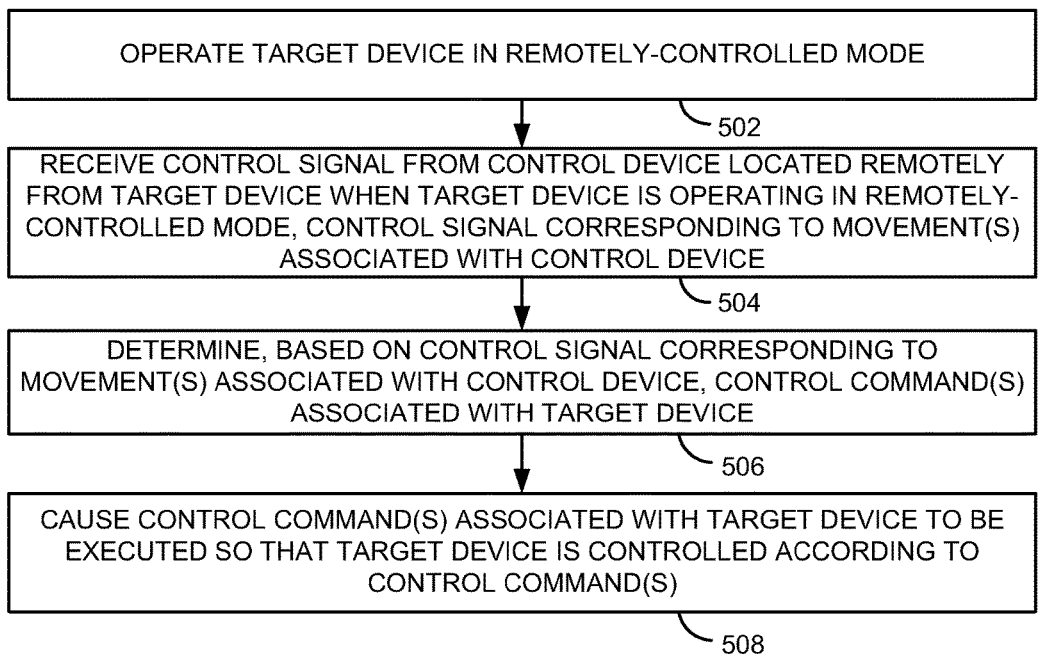
FIG. 5 illustrates a flow diagram of a method for implementing movement-based control of a target device, according to an exemplary embodiment of the present invention.

FIG. 5 illustrates a flow diagram of an exemplary method 500 for implementing movement-based control of a target device, such as control of one of the target devices described with respect to FIG. 1 using a control device such as the watch 112 (or the necklace 114 and/or the camera 116). The method 500 may include operating the target device (such as the first window shade 132) in a remotely-controlled mode as opposed to a manually-controlled mode (block 502). As discussed in detail above, the first window shade 132 may be configured to operate in one of the remotely-controlled mode or the manually-controlled mode, and may be operated in the remotely-controlled mode upon receipt and processing of a mode change signal by a receiver and/or processor of a component coupled to the first window shade 132, such as the first window shade actuator 136.

The method 500 may also include receiving a control signal from the watch 112 or other control device located remotely from the target device when the target device is operating in the remotely-controlled mode (block 504). The control signal may correspond to at least one movement associated with the watch 112 or other control device, as discussed in detail above.

The method 500 may additionally include determining, based on the control signal corresponding to the at least one movement associated with the watch 112 or other control device, at least one control command associated with the target device (block 506). As discussed in detail above, the at least one movement associated with the watch 112 may correspond to a particular control command(s) for a particular manner of control of the target device (e.g., with such a correspondence being known to the user 102 and not to other users).

The method 500 may further include causing the at least one control command associated with the target device to be executed so that the target device is controlled according to the at least one control command (block 508). For example, a processor(s) of or associated with the first window shade actuator 136 may, upon determining as described with respect to block 506 that the at least one control command is or includes a command to raise the first window shade 132, cause the first window shade actuator 136 to engage the first window shade 132 such that the first window shade 132 is raised. As will be recognized by one of ordinary skill in the art in light of the teaching and disclosure herein, any suitable manner of execution of the at least one control command so that any suitable target device(s) is/are controlled according to the at least one control command, including control of a target device(s) described elsewhere herein and/or not shown in FIG. 1, is envisioned.

Figure 6:
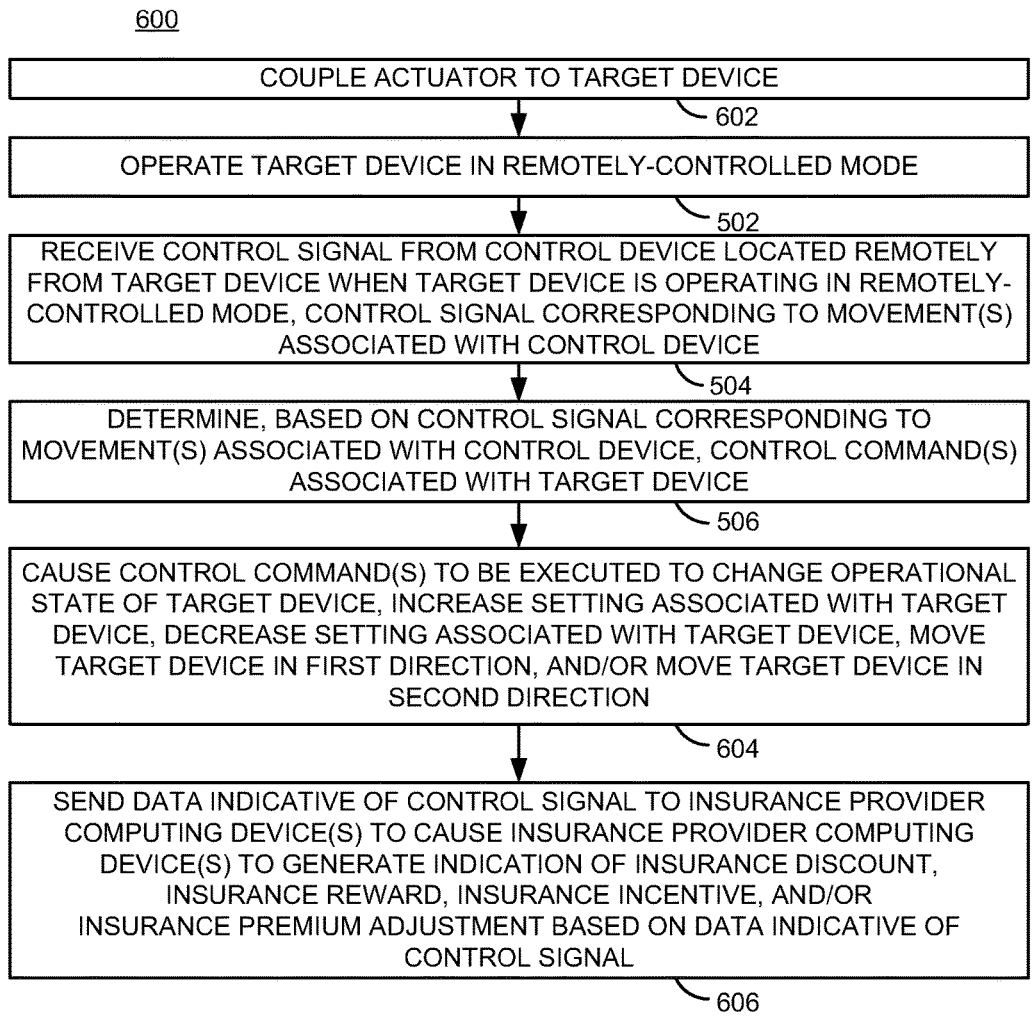
FIG. 6 illustrates a flow diagram of another method for implementing movement-based control of a target device, according to an exemplary embodiment of the present invention.

FIG. 6 illustrates a flow diagram of another exemplary method 600 for implementing movement-based control of a target device, such as control of one of the target devices described with respect to FIG. 1 using a control device such as the watch 112 (or the necklace 114 and/or the camera 116). As will be appreciated from the teaching and disclosure herein, aspects of the method 600 may correspond to a more detailed implementation(s) of aspects of the method 500, and may include additional actions relative to those described with respect to the method 500.

The method 600 may include coupling an actuator to a target device (block 602), such as in the manner described above with respect to block 402. The method 600 may also include performing the actions described with respect to blocks 502, 504, and 506 to operate the target device in a remotely-controlled mode (block 502); receive a control signal from the watch 112 or other control device when the target device is operating in the remotely-controlled mode, with the control signal corresponding to at least one movement associated with the watch 112 (block 504); and determine, based on the control signal corresponding to the at least one movement associated with the watch 112 or other control device, the at least one control command associated with the target device (block 506).

The method 600 may additionally include causing the at least one control command associated with the target device to be executed so that the target device is controlled according to the at least one control command by changing an operational state of the target device, increasing and/or decreasing a setting associated with the target device, and/or moving the target device in a first direction and/or a second direction (e.g., opposite the first direction) (block 604). It will be appreciated in light of the teaching and disclosure herein that the actions described with respect to block 604 may be a more particular implementation of the actions described with respect to block 508.

In some embodiments, changing the operational state of the target device may include turning the target device on or off, such as when the target device is, for instance, the stove 118 (e.g., turning at least one of the burners 120a-120d on, or turning all of the burners 120a-120d off) or any other suitable target device that may be in an "on" or "off" state. Increasing a setting associated with the target device may include increasing a burner setting, such as on the stove 118; increasing an amount of light by way of causing the dimmer 150 to move up; and/or any other suitable increase in a setting of a target device. Decreasing the setting (or any other setting, it being understood that the control command(s) may include commands to increase one setting and decrease another setting, for example) may include decreasing the burner setting; decreasing an amount of light by causing the dimmer 150 to move down; and/or any other suitable decrease in a setting of a target device. Moving the target device in a first direction may include, for example, causing the first window shade actuator 136 to engage the first window shade 132 so that the first window shade 132 moves up (e.g., retracts), and/or may include any other suitable movement of a target device in a first direction. Moving the target device in a second direction may include, for example, causing the first window shade actuator 136 to engage the first window shade 132 so that the first window shade 132 moves down (e.g., extends), and/or may include any other suitable movement of a target device in a second direction. The second direction may be a direction opposite the first direction or may be any other suitable direction.

The method 600 may further include sending, to one or more insurance provider computing devices (e.g., the insurance provider computing device 108, which may be an insurance provider server), data indicative of the control signal so as to cause the one or more insurance provider computing devices to generate an indication of an insurance discount, an insurance reward, an insurance incentive, and/or an insurance premium adjustment (block 606). The indication of the discount, reward, incentive, and/or premium adjustment may be generated based on the data indicative of the control signal. The actions described with respect to block 606 may be performed in the same or a similar manner as discussed in detail above with respect to block 408.

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the watch 112, the remote computing device 106, the insurance provider computing device 108, and/or any other computing devices within the example system 100 in any suitable combination). The routines may be included as part of any of the modules described in relation to FIGS. 1 and 2 or as part of a module that is external to the system illustrated by FIGS. 1 and 2. For example, the methods or portions thereof may be part of a browser application(s) or an application(s) running on any of the devices in the example system 100 as a plug-in or other module of the browser application. Further, the methods may be employed as "software-as-a-service" to provide, for example, the watch 112, the remote computing device 106, the insurance provider computing device 108, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for configuring a device for movement-based control. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for movement-based device control, the system comprising:
   a control device configured to be worn by a user, the control device configured to generate a control signal corresponding to at least one movement of the control device, the at least one movement of the control device corresponding to a control gesture of the user;
   a target device lacking a processor and located remotely from the control device; and
   a component including one or more processors, the component retrofitted to the target device, the component configured to:

change the target device from operating in a manually-controlled mode to operating in a remotely-controlled mode in response to receiving a mode change signal from the control device;

receive the control signal corresponding to the at least one movement of the control device from the control device when the target device is operating in the remotely-controlled mode;

determine based on the control signal corresponding to the at least one movement of the control device, at least one control command associated with the target device; and cause the at least one control command associated with the target device to be executed so that the target device is controlled according to the at least one control command.

2. The system of claim 1, wherein the target device includes at least one of a television, a home entertainment device, a lamp, a light fixture, a stove, an oven, a dishwasher, a refrigerator, a freezer, a microwave oven, a water fixture, a washing machine, a dryer, a thermostat, a door, a storage device, a window, a window covering, a sign, a speaker, an on-road infrastructure component, an off-road infrastructure component, a vehicle, a control device, a security device, or a computing device.

3. The system of claim 1, wherein the component retrofitted to the target device includes an actuator.

4. The system of claim 1, wherein the component is configured to establish a communicative connection between the control device and wherein the component uses at least one of Global Positioning System (GPS) technology, Wi-Fi communication, Bluetooth communication, infrared communication, line-of-sight communication, radar, or a received signal strength indicator (RSSI).

5. The system of claim 1, wherein the component is configured to cause the at least one control command associated with the target device to be executed so that the target device is controlled according to the at least one control command by causing the at least one control command associated with the target device to be executed so as to at least one of change an operational state of the target device, increase a setting associated with the target device, decrease the setting associated with the target device, move the target device in a first direction, or move the target device in a second direction.

6. The system of claim 1, further comprising one or more insurance provider computing devices, wherein at least one of the control device or the component is configured to send data indicative of the control signal to the one or more insurance provider computing devices, and wherein the one or more insurance provider computing devices are configured to generate an indication of at least one of an insurance discount, an insurance reward, an insurance incentive, or an insurance premium adjustment based on the data indicative of the control signal.

7. A method for configuring a target device lacking a processor for movement-based control, the method comprising:

identifying the target device;

configuring the target device to operate in response to a control signal received from a control device including retrofitting to the target device with a component including one or more processors;

establishing a communicative connection between the component and the control device; and receiving, at the component, the control signal from the control device via the communicative connection in response to at least one movement associated with the control device, the control signal causing the component to actuate the target device to operate according to at least one control command indicated by the control signal.

8. The method of claim 7, wherein establishing the communicative connection between the control device and the component is performed using at least one of Global Positioning System (GPS) technology, Wi-Fi communication, Bluetooth communication, infrared communication, line-of-sight communication, radar, or a received signal strength indicator (RSSI).

9. The method of claim 7, wherein the target device includes at least one of a device within an interior of a structure, a device located at least one of on or within an exterior of the structure, a television, a window, a window shade, a door, an entertainment device, a cooking device, a refrigerator, a freezer, a laundry device, a storage device, or a vehicle.

10. The method of claim 7, wherein receiving the control signal from the control device is performed one of concurrently with a voice control command causing the target device to operate according to the voice control command or during a first time interval distinct from a second time interval in which the voice control command causes the target device to operate according to the voice control command.

11. The method of claim 7, further comprising sending, to one or more insurance provider computing devices, data indicative of the control signal so as to cause the one or more insurance provider computing devices to generate an indication of at least one of an insurance discount, an insurance reward, an insurance incentive, or an insurance premium adjustment based on the data indicative of the control signal.

12. A method for implementing movement-based control of a target device lacking a processor, the method comprising:

retrofitting the target device with a component including one or more processors;

operating the target device in a remotely-controlled mode, the target device being configured to operate in one of the remotely-controlled mode or a manually-controlled mode;

receiving by the component a control signal from a control device located remotely from the target device when the target device is operating in the remotely-controlled mode, the control signal corresponding to at least one movement associated with the control device;

determining by the component, based on the control signal corresponding to the at least one movement associated with the control device, at least one control command associated with the target device;

receiving by the control device biometric data identifying an authorized user as making the at least one movement associated with the control device; and causing, by the component, the at least one control command associated with the target device to be executed so that the target device is controlled according to the at least one control command.

13. The method of claim 12, wherein the component retrofitted to the target device is an actuator, the method further comprising retrofitting the actuator to the target device.

14. The method of claim 12, wherein the target device includes at least one of a device within an interior of a structure, a device located at least one of on or within an exterior of the structure, a television, an entertainment device, a lamp, a cooking device, a water fixture, a refrigerator, a freezer, a laundry device, a thermostat, a storage device, a sign, a speaker, an on-road infrastructure component, an off-road infrastructure component, a vehicle, a control device, a security device, or a computing device.

15. The method of claim 12, wherein causing, by the component, the at least one control command associated with the target device to be executed so that the target device is controlled according to the at least one control command includes at least one of changing an operational state of the target device, increasing a setting associated with the target device, decreasing the setting associated with the target device, moving the target device in a first direction, or moving the target device in a second direction.

16. The method of claim 12, further comprising sending, to one or more insurance provider computing devices, data indicative of the control signal so as to cause the one or more insurance provider computing devices to generate an indication of at least one of an insurance discount, an insurance reward, an insurance incentive, or an insurance premium adjustment based on the data indicative of the control signal.

* * * * *